United States Patent
Gaiduk et al.

(10) Patent No.: US 10,732,398 B2
(45) Date of Patent: Aug. 4, 2020

(54) DIGITAL MICROSCOPE HAVING AN OBJECTIVE LENS AND HAVING AN IMAGE SENSOR

(71) Applicant: CARL ZEISS MICROSCOPY GMBH, Jena (DE)

(72) Inventors: Alexander Gaiduk, Jena (DE); Ralf Wolleschensky, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 0 days.

(21) Appl. No.: 16/307,566

(22) PCT Filed: May 23, 2017

(86) PCT No.: PCT/EP2017/062405
§ 371 (c)(1),
(2) Date: Dec. 6, 2018

(87) PCT Pub. No.: WO2017/211584
PCT Pub. Date: Dec. 14, 2017

(65) Prior Publication Data
US 2019/0302441 A1 Oct. 3, 2019

(30) Foreign Application Priority Data

Jun. 6, 2016 (DE) .......... 10 2016 110 407

(51) Int. Cl.
*G02B 21/36* (2006.01)
*G02B 21/00* (2006.01)
*H04N 5/341* (2011.01)

(52) U.S. Cl.
CPC ......... *G02B 21/367* (2013.01); *G02B 21/006* (2013.01); *G02B 21/365* (2013.01); *H04N 5/341* (2013.01)

(58) Field of Classification Search
CPC .. G02B 21/367; G02B 21/365; G02B 21/006; H04N 5/341
See application file for complete search history.

(56) References Cited

U.S. PATENT DOCUMENTS

| 9,645,375 B2 | 5/2017 | Kleppe et al. |
| 2004/0129064 A1 * | 7/2004 | Hinterdorfer .......... G01Q 10/06 73/105 |

(Continued)

FOREIGN PATENT DOCUMENTS

| DE | 10 2012 023024 A1 | 5/2014 |
| GB | 2 384 379 A | 7/2003 |

OTHER PUBLICATIONS

International Search Report dated Sep. 15, 2017 issued in connection with corresponding International Patent Applic.ation No. PCT/EP2017/062405 (3 pages total).

(Continued)

*Primary Examiner* — Tracy Y. Li
(74) *Attorney, Agent, or Firm* — Stuart H. Mayer; Mayer & Williams PC

(57) ABSTRACT

The present invention relates to a digital microscope that includes an objective lens for enlarged optical imaging of a sample in an image plane. An image with an optical resolution may be represented in the image plane by means of the objective lens. The microscope also includes an image sensor for converting the image, depicted on the image sensor by the objective lens, into an electrical signal. The image sensor includes a matrix of pixels by means of which a maximum image resolution of the image sensor is determined, which is finer than the optical resolution of the objective lens. The objective lens has a maximum magnification factor of at most 40. The optical resolution of the objective lens is defined as a minimum distance between two structures that are distinguishable in the image. The maxi- (Continued)

mum image resolution of the image sensor is defined by a pixel pitch. A quotient of the minimum distance between two structures that are distinguishable in the image and the pixel pitch defines a scanning factor that is at least 5.

17 Claims, 3 Drawing Sheets

(56) References Cited

U.S. PATENT DOCUMENTS

| | | | |
|---|---|---|---|
| 2004/0159773 A1* | 8/2004 | Fein | G01N 21/6458 250/208.1 |
| 2006/0171038 A1 | 8/2006 | Hung et al. | |
| 2006/0275847 A1* | 12/2006 | Goodyer | G01N 21/6428 435/7.32 |
| 2010/0303386 A1 | 12/2010 | Enderlein | |

OTHER PUBLICATIONS

International Preliminary Report on Patentability dated Dec. 11, 2018 in connection with corresponding International Patent Application No. PCT/EP2017/062405 (8 pages total).

Heintzmann R et al. "Breaking the resolution limit in light microscopy", Briefings in Functional Genomics and Proteomics, vol. 5, No. 4, pp. 289-301 (Jan. 1, 2006).

Heintzmann R et al. "The sampling limit in fluorescence microscopy", Micron 38 (2007) 145-149.

Heintzmann R et al. "Band Limit and Appropriate Sampling in Microscopy", Cell Biology, Chapter 3, pp. 29-36 (Jan. 1, 2006).

E. J. Botcherby, R. Juskaitis, M. J. Booth, T. Wilson: "An optical technique for remote focusing in microscopy" in Optics Communications 281 (2008) 880-887.

* cited by examiner

DIGITAL MICROSCOPE HAVING AN OBJECTIVE LENS AND HAVING AN IMAGE SENSOR

FIELD

The present invention relates to a digital microscope having an objective lens for enlarged optical imaging of a sample in an image plane, and having an image sensor for converting the image, depicted on the image sensor by the objective lens, into an electrical signal.

BACKGROUND

GB 2 384 379 A discloses a display system having a camera and a display for the front area of a train. The digital camera is high-resolution. Zooming of the displayed image is achieved by enlarging the digital image, as the result of which only a small portion of the image is visible.

US 2006/0171038 A1 discloses a system for zooming digital images. The system includes an image sensor, an A/D converter, an image processing unit, and a display. The sensitivity of the image converter is higher than the resolution of the display. For example, the image converter is formed by a CMOS converter having a resolution of 4096× 3072 pixels, while the display has a resolution of 1024×768 pixels.

The SC100 digital camera manufactured by Olympus has an image sensor with 10.6 million pixels having a pixel pitch of 1.67 μm. The camera has a maximum refresh rate of 42 images per second at a resolution of 968×686 pixels. The refresh rate drops to 3 images per second when the highest resolution is used.

A method for refocusing is presented in the technical article by E. J. Botcherby, R. Juskaitis, M. J. Booth, T. Wilson: "An optical technique for remote focusing in microscopy" in Optics Communications 281 (2008) 880-887. This method avoids spherical aberration, and allows a large axial scan area and a high scan speed without mechanical interference between the objective lens and the sample.

SUMMARY

A object of the present invention, proceeding from the prior art, is to avoid the disadvantages of undersampling in a digital microscope.

The stated object is achieved by a digital microscope according to appended claim 1.

A digital microscope according to the invention is used to microscopically examine a sample. Electronic image conversion takes place in the digital microscope, and the recorded image in the form of digital data is further processed and displayed on an electronic image rendering device.

A digital microscope includes, firstly, an objective lens for enlarged optical imaging of the sample in an image plane. An image with an optical resolution may be represented in the image plane by means of the objective lens. The optical resolution is determined by the physical operations and the properties of the objective lens. The objective lens includes optical components for enlarged optical imaging of the sample in the image plane. The optical components are formed in particular by optical lenses and optionally by one or more diaphragms and filters. The depicted image is preferably formed by a photograph.

A digital microscope also includes an image sensor for converting the image, depicted on the image sensor by the objective lens, into an electrical signal. The image sensor includes a matrix of pixels, i.e., a matrix composed of individual image sensor elements. The matrix of pixels determines a maximum image resolution of the image sensor. Converting the image by means of the image sensor results in localized two-dimensional scanning of the image. The image sensor represents an image sensor, and is preferably formed by a CMOS image sensor. The matrix does not involve just a single or a few row(s) of pixels, as used for scanning methods, for example. The number of pixels in each row of the matrix and the number of pixels in each column of the matrix are within the same order of magnitude.

According to the invention, the maximum image resolution of the image sensor is finer than the optical resolution of the objective lens, so that the pixels of the image sensor are smaller than the smallest structures in the image depicted by the objective lens. Thus, the image sensor has a higher resolving power than the objective lens. If a resolution of fairly small structures is regarded as a higher resolution, the maximum image resolution of the image sensor is higher than the optical resolution of the objective lens. If the resolution is indicated by a distance between two structures that are just barely representable or distinguishable, the maximum image resolution of the image sensor is less than the optical resolution of the objective lens.

If the objective lens has changeable properties that influence the optical resolution of the objective lens, the maximum image resolution of the image sensor is finer than any optical resolution that is achievable with the objective lens. In particular, a magnification factor of the objective lens may be changeable by a user, thus changing the optical resolution of the objective lens. According to the invention, for any magnification factor that is selectable on the objective lens, the maximum image resolution of the image sensor is finer than the resulting optical resolution of the objective lens. In particular, for the highest magnification factor that is selectable on the objective lens, the maximum image resolution of the image sensor is finer than the resulting optical resolution of the objective lens.

According to the invention, the objective lens has a maximum magnification factor of at most 40. If the objective lens has a fixed magnification factor, this also represents the maximum magnification factor.

One particular advantage of the digital microscope according to the invention is that the image conversion by the image sensor basically takes place with localized oversampling of the image. For this purpose, according to the invention an objective lens having a low magnification factor of at most 40 is used, which is available at low cost. Similarly, an electronic image sensor having image resolution that is sufficient for the oversampling is used. Electronic image sensors having very high image resolutions are likewise currently available at low cost.

The maximum image resolution of the image sensor is preferably at least 2 times finer than the optical resolution of the objective lens. The maximum image resolution of the image sensor is more preferably at least 3 times finer than the optical resolution of the objective lens. Multiple overscanning is thus achieved, thus ensuring, for example, a higher contrast in the converted image. In addition, noise suppression with regard to diffraction-limited areas of the objective lens may be made possible, which can take place in temporal and spatial correlation.

In preferred embodiments, the maximum image resolution of the image sensor is at least 5 times finer than the optical resolution of the objective lens. In further preferred embodiments, the maximum image resolution of the image sensor is at least 10 times finer than the optical resolution of the objective lens. This results in higher-order oversampling which ensures high quality of the converted image. For example, rapid and aberration-free 3D microscopy may be achieved in this way. In addition, rapid autofocusing, rapid phase detection, high spectral resolution, high temporal resolution, and/or an improved dynamic range may also be achieved.

In preferred embodiments of the digital microscope, the maximum magnification factor is at most 30. In further preferred embodiments of the digital microscope, the maximum magnification factor is at most 20. In further preferred embodiments of the digital microscope, the maximum magnification factor is at most 10. In further preferred embodiments of the digital microscope, the maximum magnification factor is at most 5.

The optical resolution of the objective lens is defined as a minimum distance between two structures that are just barely distinguishable in the depicted image. Thus, the optical resolution is the distance that must at least be present between the two structures in order to still perceive than as separate structures. The structures are preferably formed by punctiform objects or by lines. Correspondingly, the optical resolution is preferably defined by the distance between these two lines.

The maximum image resolution of the image sensor is defined by a pixel pitch. The pixel pitch is the distance between two directly adjoining pixels. The pixel pitch is the quotient of the extension of the image sensor in one of its directions of extension and the number of pixels in this direction of extension. The pixel pitch is, for example, the quotient of the width of the image sensor and the number of pixels in one row of the matrix. The pixel pitch is, for example, the quotient of the height of the image sensor and the number of pixels in one column of the matrix.

A quotient of the minimum distance between two structures that are distinguishable in the image and the pixel pitch represents a localized scanning factor. Thus, the scanning factor is the quotient of the optical resolution of the objective lens and the maximum image resolution of the image sensor. According to the invention, the scanning factor is at least 5. The scanning factor is preferably at least 6.

In preferred embodiments of the digital microscope, the pixel pitch of the image sensor is at most 2 µm. In further preferred embodiments of the digital microscope, the pixel pitch of the image sensor is at most 1.85 µm. The pixel pitch of the image sensor is particularly preferably 2.0 µm, 1.8 µm, 1.6 µm, 1.4 µm, 1.2 µm, 1.0 µm, 0.8 µm, or 0.6 µm.

The number of pixels in a column of the matrix-type image sensor is preferably at least 1000, while at the same time the number of pixels in a row of the matrix-type image sensor is likewise at least 1000.

In preferred embodiments of the digital microscope, the number of pixels of the image sensor is at least 5 million. In further preferred embodiments of the digital microscope, the number of pixels of the image sensor is at least 8 million. In further preferred embodiments of the digital microscope, the number of pixels of the image sensor is at least 20 million. In further preferred embodiments of the digital microscope, the number of pixels of the image sensor is at least 50 million. In further preferred embodiments of the digital microscope, the number of pixels of the image sensor is at least 100 million.

In preferred embodiments of the digital microscope, the ratio of the height of the image sensor to a height of the individual pixels is at least 3000. In further preferred embodiments of the digital microscope, the ratio of the height of the image sensor to the height of the individual pixels is at least 3900. The ratio of the height of the image sensor to the height of the individual pixels is particularly preferably 3900, 4000, 5000, 6000, 7000, or 10,000.

In preferred embodiments of the digital microscope, the ratio of the width of the image sensor to a width of the individual pixels is at least 2000. In further preferred embodiments of the digital microscope, the ratio of the width of the image sensor to the width of the individual pixels is at least 2800. The ratio of the width of the image sensor to the width of the individual pixels is particularly preferably 2800, 3000, 4000, 5000, 7000, or 10,000.

The width of the image sensor is preferably between 6 mm and 25 mm, particularly preferably between 7 mm and 10 mm. The height of the image sensor is preferably between 4 mm and 25 mm, particularly preferably between 7 mm and 10 mm.

The objective lens has a numerical aperture that is preferably at most 1.4. The numerical aperture is more preferably at most 1. The numerical aperture is particularly preferably 0.25, 0.5, 0.8, 1.0, or 1.4.

Preferably at least one filter is situated in front of the image sensor. For example, a filter having one of three colors may be situated in front of each pixel of the image sensor. The filter(s) may be tunable.

Preferably situated in front of the image sensor is an optical element that results in wavelength-dependent delays for the light passing through, so that spectral resolution by Fourier spectroscopy is made possible.

Preferably at least one polarizer is situated in front of the image sensor. A plurality of the polarizers is preferably situated in front of the image sensor, so that a spatially resolved, polarized image of the sample may be recorded.

The image processing unit of the digital microscope is preferably configured for processing the signals of multiple pixels of the image sensor with different delays in order to achieve temporal resolution, so that, for example, spatially unresolvable areas of the sample may be resolved. Spatial resolution and temporal resolution are thus achievable.

The image processing unit of the digital microscope is preferably configured for processing the signals of multiple pixels of the image sensor with different sensitivities and/or different amplifications, so that, for example, spatially unresolvable areas of the sample may be resolved.

In preferred embodiments of the digital microscope, the magnification factor of the objective lens is changeable from a minimum magnification factor up to the maximum magnification factor, so that the objective lens is designed as a zoom objective lens, for example. According to the invention, the maximum image resolution of the image sensor, independent of the selected magnification factor, is in principle finer than the optical resolution of the objective lens. The resolution that is achievable with the digital microscope is constant, and is determined only by the maximum image resolution of the image sensor.

The digital microscope is preferably designed for automated recording of subareas of the sample. These subareas are also refined to as tiles. Therefore, this is a so-called scanning microscope for large samples. The digital microscope correspondingly preferably includes a sample carrier that is movable in an automated manner, by means of which the individual tiles may be recorded. The digital microscope also includes an image processing unit that is designed for combining recorded images of the subareas into an image of the sample.

The digital microscope preferably includes an electronic mobile device that is preferably formed by a smart phone or a tablet computer. The electronic mobile device includes a camera which has the image sensor and preferably at least a portion of the objective lens. The electronic mobile device preferably includes the objective lens, which in the reverse direction may also be used for macroscopic photography, i.e., for customary photography using the mobile device. However, the objective lens may also be separate from the mobile device, so that the camera includes the image sensor, but not the objective lens.

A first exemplary embodiment of the digital microscope according to the invention has a digital zoom but no optical zoom, so that the magnification factor of the objective lens is fixed. The microscope includes an image sensor having 41 million pixels in a matrix of 7152×5360 active pixels. The size of the image sensor is 8 mm×6 mm. The digital zoom factor is 3.4 in a case for which the converted image has a resolution of 1600×1600 pixels without interpolation or extrapolation. The digital zoom factor is 6 in a case for which the converted image has a resolution of 1000×1000 pixels without interpolation or extrapolation.

A second exemplary embodiment of the digital microscope according to the invention is a high-speed scanning microscope for large samples. The microscope includes an image sensor having 41 million pixels in a matrix of 7152×5360 active pixels. The size of the image sensor is 8 mm×6 mm. The microscope includes an objective lens with a numerical aperture of 0.25 and a magnification factor of 5. In this embodiment of the microscope according to the invention, this objective lens results in digitization of the sample that is 16 times faster than for a microscope according to the prior art, having an objective lens with a numerical aperture of 0.25 and a magnification factor of 20. Alternatively, the microscope includes an objective lens with a numerical aperture of 0.5 and a magnification factor of 10. In this embodiment of the microscope according to the invention, this objective lens results in digitization of the sample that is 16 times faster than for a microscope according to the prior art, having an objective lens with a numerical aperture of 0.5 and a magnification factor of 40. Alternatively, the microscope includes an objective lens with a numerical aperture of 0.8 and a magnification factor of 20. In this embodiment of the microscope according to the invention, this objective lens results in digitization of the sample that is 20 times faster than for a microscope according to the prior art, having an objective lens with a numerical aperture of 0.8 and a magnification factor of 100. Alternatively, the microscope includes an objective lens with a numerical aperture of 1.0 and a magnification factor of 20. In this embodiment of the microscope according to the invention, this objective lens results in digitization of the sample that is 56 times faster than for a microscope according to the prior art, having an objective lens with a numerical aperture of 1.0 and a magnification factor of 150. Alternatively, the microscope includes an objective lens with a numerical aperture of 1.4 and a magnification factor of 40. In this embodiment of the microscope according to the invention, this objective lens results in digitization of the sample that is 14 times faster than for a microscope according to the prior art, having an objective lens with a numerical aperture of 1.4 and a magnification factor of 150.

A third exemplary embodiment of the digital microscope according to the invention is a high-speed scanning microscope for large samples. For illustration of the invention, it is assumed by way of example that a sample is microscopically examined with a suitable resolution, resulting in an image with 15,000×7000 pixels. In this embodiment, the digital microscope includes an image sensor that has 18 million pixels in a matrix of approximately 5000×3500 active pixels, and that allows a refresh rate of 10 images per second. Accordingly, a division into (15,000/5.000)·(7000/3500)=3·2=6 tiles is required. The positioning of the sample for each tile lasts approximately 2 seconds. Accordingly, the recording of the overall sample takes: 6·1/(10 1/s)+6·2 s≅13 s. Alternatively, the refresh rate is 1 image per second, resulting in a time of 6·1/(1 1/s)+6·2 s=18 s for recording the overall sample. In comparison, a digital microscope according to the prior art, by way of example, includes an image sensor that has 2 million pixels in a matrix of approximately 2000×1000 active pixels, and that allows a refresh rate of 25 images per second. Accordingly, a division into (15,000/2000)·(7000/1000)≅7·7=49 tiles is required. The positioning of the sample for each tile lasts approximately 1 second. Accordingly, the recording of the overall sample takes: 49·1/(25 1/s)+49·1 s≅51 s. This comparison illustrates that the digital microscope according to the invention in this embodiment allows recording of the overall sample that is several times faster.

A fourth exemplary embodiment of the digital microscope according to the invention includes an electronic mobile device in the form of a smart phone, tablet computer, or the like. The electronic mobile device includes a camera with an image sensor, which forms the image sensor of the microscope. The image sensor has a small pixel pitch of less than 2.0 μm and a large pixel count of 8, 13, 20, 40, 50, or 100 million pixels.

Table 1 below lists parameters of seven different embodiments of the microscope according to the invention. The magnification factor M of the objective lens is given in the first column. The numerical aperture NA of the objective lens is given in the second column. In all seven embodiments, light having an average wavelength λ=500 nm is used. The resolution factor RF is 1.22 in all seven embodiments. The optical resolution Δx of the objective lens is given in the third column. The optical resolution Δx is expressed as Δx=RF·λ/(2·NA) according to the Rayleigh criterion. For indication of the representable line pairs, it is assumed that each of the line pairs is as wide as the optical resolution Δx, so that the number of line pairs LP per mm is given as 1/Δx in the fourth column. In addition, a factor of 4, based on the Nyquist condition, is assumed. The pixel pitch PP of the image sensor that results according to the invention is given in the fifth column. The pixel pitch is preferably smaller than the indicated value.

TABLE 1

| M | NA | Δx in nm | LP per mm | PP in μm |
|---|---|---|---|---|
| 2.50 | 0.075 | 4076 | 246 | 2.542 |
| 10 | 0.45 | 678 | 1475 | 1.694 |
| 20 | 0.8 | 381 | 2623 | 1.906 |
| 40 | 0.95 | 321 | 3115 | 3.211 |
| 63 | 1.4 | 218 | 4590 | 3.431 |
| 25 | 0.3 | 1017 | 984 | 6.354 |

BRIEF DESCRIPTION OF THE DRAWINGS

Further particulars and refinements of the invention result from the following description of preferred embodiments of the invention, with reference to the drawings, which show the following.

DETAILED DESCRIPTION

Figure 1:
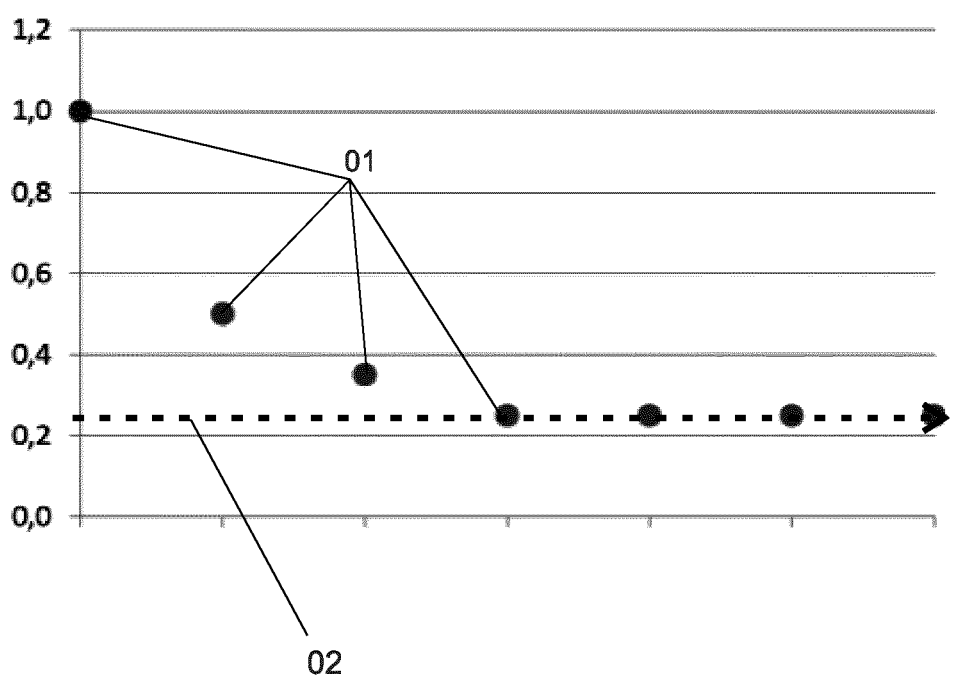
FIG. 1 shows a diagram for illustrating the dependency of the resolution on the magnification factor, for a microscope according to the invention and for a microscope according to the prior art.

FIG. 1 shows a diagram for illustrating the dependency of the resolution of a microscope on the magnification factor of the microscope, in one preferred embodiment of a microscope according to the invention and for a microscope according to the prior art. The magnification factor is plotted on the x axis of the diagram. The resolution in µm is plotted on the y axis of the diagram. A first graph 01 composed of multiple points shows the dependency of the resolution on the magnification factor for a microscope according to the prior art. The resolution is not constant, and becomes finer as the magnification factor increases, and approaches a minimum value. A second graph 02 shows the dependency of the resolution on the magnification factor for one preferred embodiment of the digital microscope according to the invention. The resolution is not dependent on the magnification factor, and in comparison to the prior art always has the minimum value.

Figure 2:
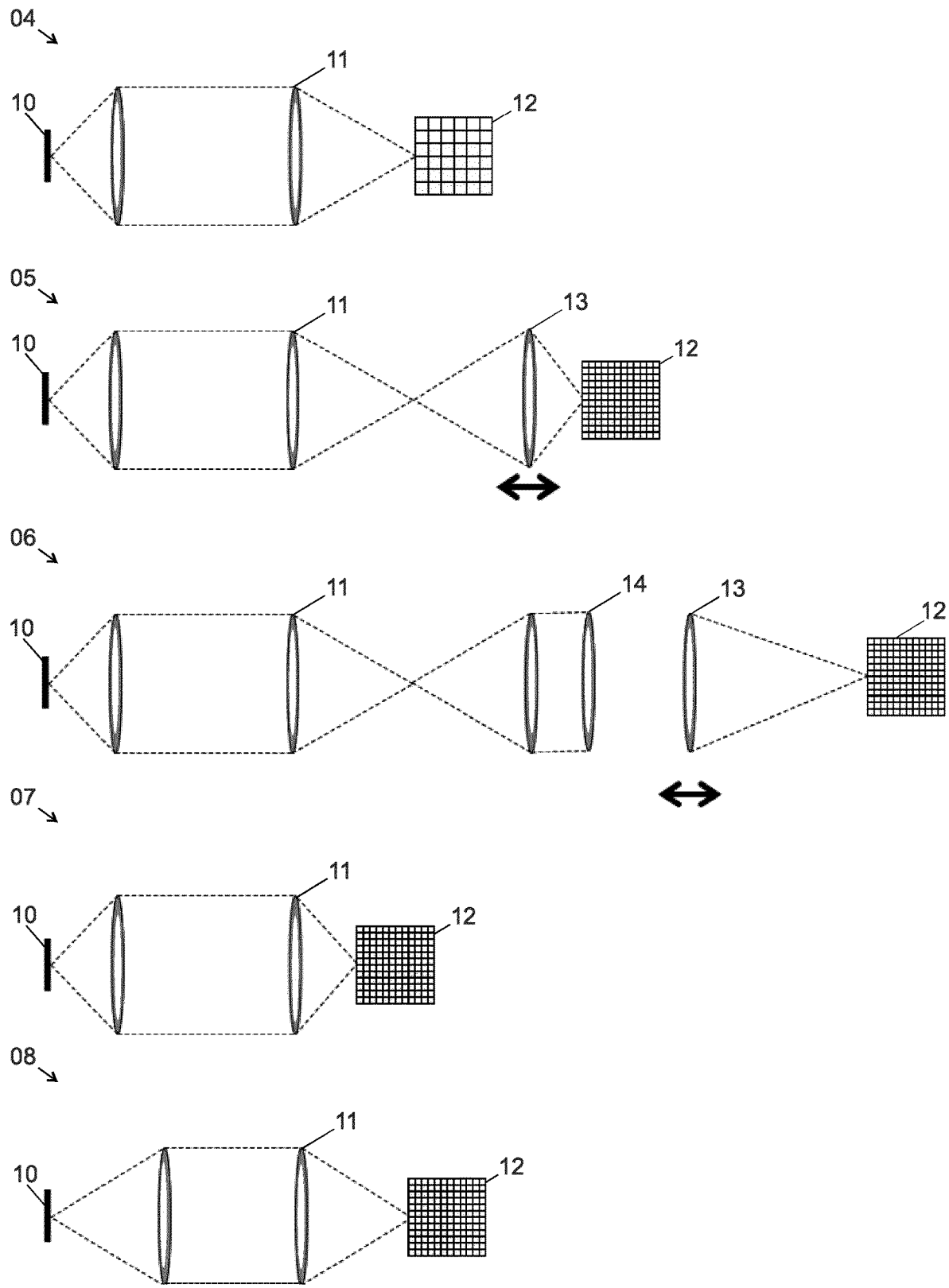
FIG. 2 shows a comparative illustration of embodiments of the microscope according to the invention and microscopes according to the prior art.

FIG. 2 shows a comparative illustration of embodiments of the microscope according to the invention and microscopes according to the prior art. A first embodiment 04, a second embodiment 05, and a third embodiment 06 according to the prior art are illustrated. Also illustrated are a first preferred embodiment 07 and a second preferred embodiment 08 of the microscope according to the invention. A sample 10, an objective lens 11, and an image sensor 12 are illustrated in each case. The objective lens 11 of the first embodiment 04 according to the prior art has a fixed magnification factor. The image sensor 12 of the first embodiment 04 according to the prior art has a large pixel pitch, which results in localized undersampling. The image sensor 12 of the second embodiment 05 according to the prior art and the image sensor 12 of the third embodiment 06 according to the prior art are each situated in a smart phone (not illustrated), and have a fairly small pixel pitch. A lens 13, which at the same time forms a portion of the objective lens 11, is situated in each case in the smart phone. The objective lens 11 of the third embodiment 06 also has an eyepiece 14. Since the distance from the smart phone is variable, the magnification factor also varies. However, the imaging thus achievable is not adapted to the particular image sensor 12. The first embodiment 07 and the second embodiment 08 of the microscope according to the invention differ from the embodiments 04, 05, 06 according to the prior art in particular in that they have a small magnification factor of at most 40. This also results in a larger field of view. In the two embodiments 07, 08 according to the invention, the imaging of the objective lens 11 is adapted to the image sensor 12 having a small pixel pitch of at most 2.0 µm, thus ensuring localized oversampling.

Figure 3:
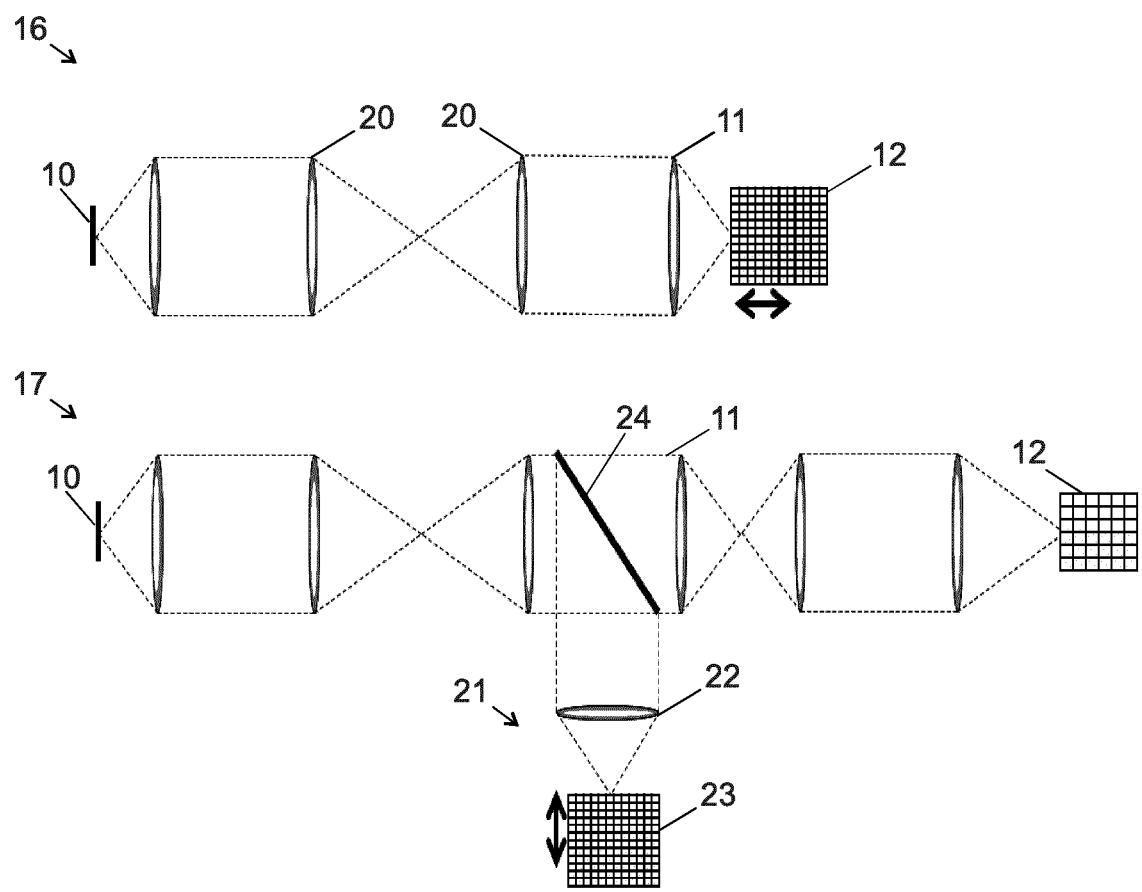
FIG. 3 shows a further illustration of two embodiments of the microscope according to the invention.

FIG. 3 shows another illustration of two embodiments of the microscope according to the invention. A third preferred embodiment 16 and a fourth preferred embodiment 17 of the microscope according to the invention are illustrated, and in each case once again include the objective lens 11 and the image sensor 12. The objective lens 11 of the third embodiment 16 includes two identical partial objective lenses 20, each of which may comprise a group of lenses or a single lens. The fourth embodiment 17 includes a device 21 for automatic focusing, using a further objective lens 22 and a further image sensor 23. The fourth embodiment 17 includes a beam splitter 24, which may be formed by a 50/50 beam splitter, a polarization beam splitter, a mirror, or an interference beam splitter. The beam splitter 24 is optionally removable.

The pixel pitch of the image sensor 12 of the third embodiment 16 is 1 µm, while the pixel pitch of the image sensor 12 of the fourth embodiment 17 is 2 µm. The number of pixels of the image sensor 12 is 15.2 million by way of example. The magnification factor of the objective lens 11 of the third and fourth embodiments 16, 17 is 4, and alternatively is 10 or 20. The third embodiment 16 is designed as a scanning microscope, for which purpose the image sensor 12 is movable.

The small value of the pixel pitch of at most 2 µm results in an improvement in the image quality, in particular an aberration-free image. In addition, the small value of the pixel pitch of at most 2 µm allows rapid autofocusing by multispot measurement, using an objective having a small magnification factor of at most 40, for example 4, 10, or 20. If the objective lens has a magnification factor of 4, the image sensor must have at least 15.2 million pixels. If the objective lens has a magnification factor of 10, the image sensor must have at least 2.5 million pixels. If the objective lens has a magnification factor of 20, the image sensor must have at least 630,000 pixels. If an objective lens having a higher magnification factor is used, an image sensor having a smaller number of pixels is required in order to achieve the same function. If the objective lens has a magnification factor of 60, the image sensor must have at least 68,000 pixels. If the objective lens has a magnification factor of 100, the image sensor must have at least 33,000 pixels.

LIST OF REFERENCE NUMERALS 01 first graph
02 second graph
03 -
04 first embodiment according to the prior art
05 second embodiment according to the prior art
06 third embodiment according to the prior art
07 first embodiment of the microscope according to the invention
08 second embodiment of the microscope according to the invention
09 -
10 sample
11 objective
12 image sensor
13 lens
14 eyepiece
15 -
16 third embodiment of the microscope according to the invention
17 fourth embodiment of the microscope according to the invention
18 -
19 -
20 partial objective lens
21 device for automatic focusing
22 further objective lens
23 further image sensor
24 beam splitter

The invention claimed is:

1. A digital microscope comprising:
   an objective lens for enlarged optical imaging of a sample in an image plane, wherein an image with an optical resolution may be represented in the image plane by means of the objective lens; and
   an image sensor for converting the image depicted on the image sensor by the objective lens, into an electrical signal, wherein the image sensor includes a matrix of pixels by means of which a maximum image resolution of the image sensor is determined,
   wherein the maximum image resolution of the image sensor is finer than the optical resolution of the objective lens, and the objective lens has a maximum magnification factor of at most 40, wherein the optical resolution of the objective lens is defined as a minimum distance between two structures that are distinguishable in the depicted image, and wherein the maximum image resolution of the image sensor is defined by a pixel pitch, and wherein a quotient of the minimum distance between two structures that are distinguishable in the image and the pixel pitch defines a scanning factor that is at least 5.

2. The microscope according to claim 1, wherein the maximum magnification factor of the objective lens is at most 20.

3. The microscope according to claim 2 wherein the maximum magnification factor of the objective lens is at most 10.

4. The microscope according to claim 1, wherein a pixel pitch of the image sensor is at most 2 μm.

5. The microscope according to claim 4, wherein the pixel pitch of the image sensor is at most 1.85 μm.

6. The microscope according to claim 1, wherein the number of pixels of the image sensor is at least 8 million.

7. The microscope according to claim 6, wherein the number of pixels of the image sensor is at least 20 million.

8. The microscope according to claim 7, wherein the number of pixels of the image sensor is at least 50 million.

9. The microscope according to claim 1, wherein the ratio of a height of the image sensor to a height of the individual pixels of the image sensor is at least 3900.

10. The microscope according to claim 1, wherein the ratio of a width of the image sensor to a width of the individual pixels of the image sensor is at least 2800.

11. The microscope according to claim 1, wherein the objective lens has a numerical aperture that is at most 1.4.

12. The microscope according to claim 11, wherein the numerical aperture of the objective lens is at most 1.

13. The microscope according to claim 1, wherein the magnification factor of the objective lens is changeable from a minimum magnification factor up to the maximum magnification factor, wherein the maximum image resolution of the image sensor, independent of the selected magnification factor, is higher than the optical resolution of the objective lens.

14. The microscope according to claim 1, wherein the microscope is configured for automated recording of subareas of the sample, and wherein an image processing unit of the microscope is designed for combining recorded images of the subareas into an image of the sample.

15. The microscope according to claim 1, further comprising an electronic mobile device formed by a smart phone or a tablet computer including a camera with the image sensor.

16. The microscope of claim 14 further comprising a sample carrier movable in an automated manner to record individual tiles.

17. The microscope of claim 15, the camera further comprising the objective lens, wherein in the reverse direction the objective lens may be used for macroscopic photography.

* * * * *